L. BECKER.
Wringer.

No. 165,057.                    Patented June 29, 1875.

WITNESSES:

INVENTOR:
Leander Becker
BY
ATTORNEYS.

UNITED STATES PATENT OFFICE.

LEANDER BECKER, OF YORK, PENNSYLVANIA.

IMPROVEMENT IN WRINGERS.

Specification forming part of Letters Patent No. 165,057, dated June 29, 1875; application filed May 25, 1875.

*To all whom it may concern:*

Be it known that I, LEANDER BECKER, of the city and county of York, and State of Pennsylvania, have invented a new and Improved Combined Washing-Machine and Wringer; and I do hereby declare that the following is a full, clear, and exact description of the same, reference being had to the accompanying drawing, forming a part of this specification, in which—

Figure 1:
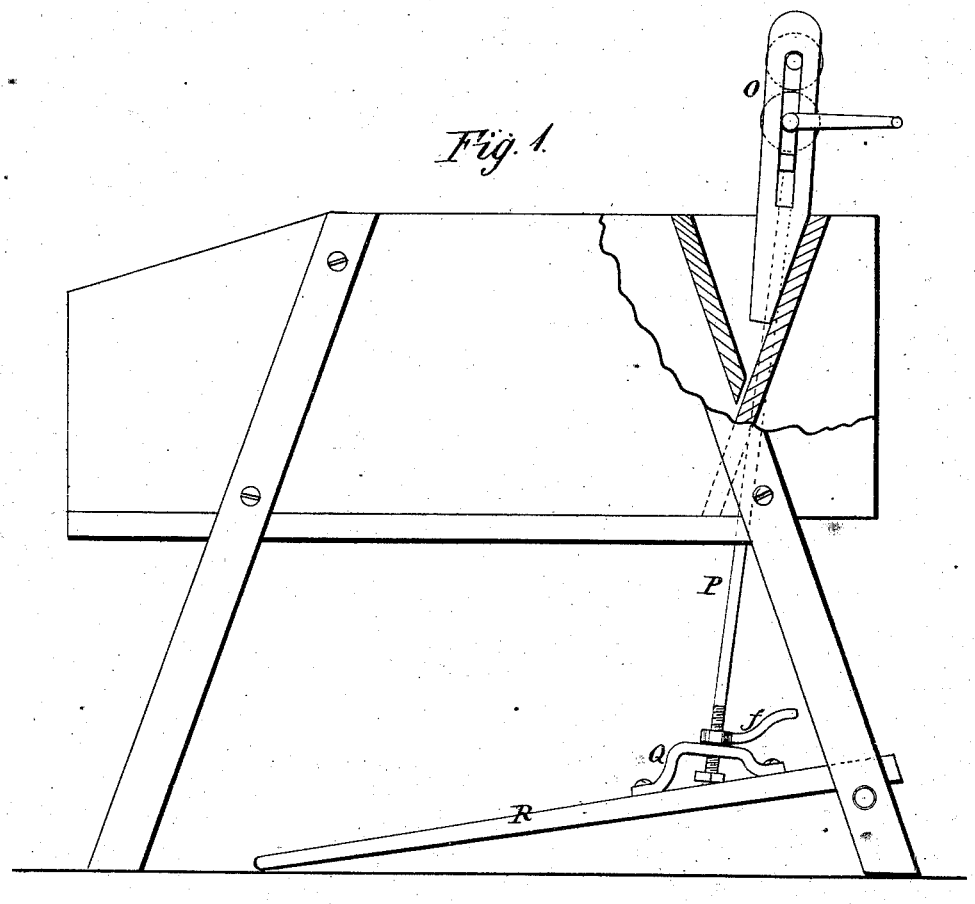
Figure 2:
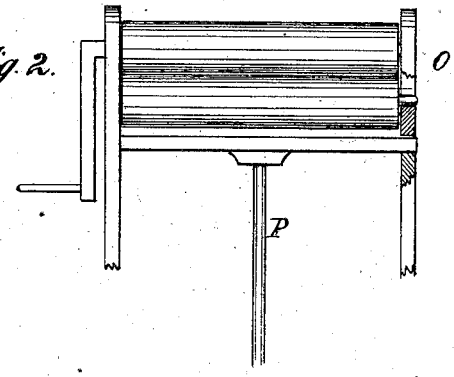

Figure 1 is a side elevation, with parts broken away, of the wringer, as combined with the washer-frame, to control the pressure upon the rolls. Fig. 2 is a detail, showing the connection of the vertical rod with the roller.

This invention relates to certain improvements in that class of washing-machines in which the weight of the washer furnishes the pressure for the wringer-rolls; and it consists in the combination, with the body of the washer and the adjustable bearings of the wringer-roll, of a vertical rod attached at the top to the said bearings, and at the bottom, by means of a strap and adjusting-nut, with a lever, which rests upon the ground at one end, and is pivoted to the frame at the other, by means of which arrangement the whole weight of the washer, or any part of the same, may be employed as a pressure upon the wringer-roll.

In the drawing, O represents a wringer, located above the trough opening into the washer, which said trough receives the drip-water from the wringer. The bearings of the bottom roll are connected by a cross-piece, and to the latter is attached a vertical rod, P, which is screw-threaded at its lower extremity, and passes through a strap, Q, upon a lever, R. Said lever rests at one end upon the ground, and serves, when screwed down by a nut, $f$, upon the vertical rod, to convert the weight of the machine into the pressure upon the wringer-roll, whereby the use of springs to serve the same purpose may be dispensed with. The elasticity of the lever R enables the operator, when screwing up the nut $f$, to employ any degree of adjustment that may be desired from a few turns of the nut to produce a slight pressure to the employment of the entire weight of the washer, thus securing a ready adjustment without the use of springs, and one which is durable and always reliable.

I am aware of the fact that it is not new to employ the weight of a tub to produce, in combination with the wringer, the requisite pressure upon the rolls of the same, and I, therefore, limit myself to any particular construction whereby any portion of the weight of the washer may be employed that may be desired.

Having thus described my invention, what I claim as new is—

The combination, with the body of the washer and the bearings of the adjustable wringer-roll, of the vertical rod P, the strap Q, lever R, and adjusting-nut $f$ substantially as and for the purpose described.

LEANDER BECKER.

Witnesses:
J. H. BAER,
M. J. SKINNER.